US011435981B2

(12) United States Patent
Kim et al.

(10) Patent No.: US 11,435,981 B2
(45) Date of Patent: Sep. 6, 2022

(54) ARITHMETIC CIRCUIT, AND NEURAL PROCESSING UNIT AND ELECTRONIC APPARATUS INCLUDING THE SAME

(71) Applicant: SAMSUNG ELECTRONICS CO., LTD., Suwon-si (KR)

(72) Inventors: Yonghwan Kim, Suwon-si (KR); Wook Kim, Suwon-si (KR); Jaejoon Kim, Pohang-si (KR); Sungju Ryu, Busan (KR)

(73) Assignees: SAMSUNG ELECTRONICS CO., LTD., Suwon-si (KR); POSTECH RESEARCH AND BUSINESS DEVELOPMENT FOUNDATION, Gyeongsangbuk-do (KR)

( * ) Notice: Subject to any disclaimer, the term of this patent is extended or adjusted under 35 U.S.C. 154(b) by 0 days.

(21) Appl. No.: 16/847,872

(22) Filed: Apr. 14, 2020

(65) Prior Publication Data

US 2021/0064339 A1 Mar. 4, 2021

(30) Foreign Application Priority Data

Sep. 3, 2019 (KR) .................... 10-2019-0108893

(51) Int. Cl.
*G06F 7/501* (2006.01)
*G06N 3/063* (2006.01)
(Continued)

(52) U.S. Cl.
CPC .............. *G06F 7/501* (2013.01); *G06F 7/523* (2013.01); *G06F 7/57* (2013.01); *G06N 3/063* (2013.01)

(58) Field of Classification Search
CPC ................... G06F 7/509–5095; G06F 7/5443
See application file for complete search history.

(56) References Cited

U.S. PATENT DOCUMENTS 5,010,509 A * 4/1991 Cox ........................ G06F 17/16
708/505
5,337,395 A 8/1994 Vassiliadis et al.
(Continued)

FOREIGN PATENT DOCUMENTS

KR        10-1094574         12/2011
KR    10-2019-0005043          1/2019

OTHER PUBLICATIONS

Ryu, et al., "Feedforward-Cutset-Free Pipelined Multiply-Accumulate Unit for the Machine Learning Accelerator", IEEE Transactions on Very Large Scale Integration (VLSI) Systems, vol. 27, No. 1, Jan. 2019.

(Continued)

*Primary Examiner* — Matthew D Sandifer
(74) *Attorney, Agent, or Firm* — F. Chau & Associates, LLC

(57) ABSTRACT

An arithmetic circuit includes an input buffer latching each of a plurality of input signals, sequentially input, and sequentially outputting a plurality of first addition signals and a plurality of second addition signals based on the plurality of input signals; a first ripple carry adder (RCA) performing a first part of an accumulation operation on the first addition signals to generate a carry; a flip-flop; a second RCA performing a second part of the accumulation operation on the second addition signals and an output of the flop-flop; the first RCA latching the carry in the flip-flop after the accumulation operation is performed; and an output buffer latching an output signal of the first RCA and an output signal of the second RCA, and outputting a sum signal representing a sum of the plurality of input signals.

16 Claims, 11 Drawing Sheets

(51) Int. Cl.
    *G06F 7/57*       (2006.01)
    *G06F 7/523*    (2006.01)

(56) References Cited

U.S. PATENT DOCUMENTS

| | | |
|---|---|---|
| 5,812,993 A | 9/1998 | Ginosar et al. |
| 6,009,448 A | 12/1999 | Jong et al. |
| 6,463,453 B1 | 10/2002 | Dang |
| 7,424,503 B2 * | 9/2008 | Moore .................. G06F 7/5095 |
| | | 708/490 |
| 10,024,916 B2 | 7/2018 | Bowman et al. |
| 10,075,193 B2 | 9/2018 | Gross et al. |
| 10,210,137 B2 | 1/2019 | Cohen et al. |
| 2011/0238721 A1 * | 9/2011 | Xiu .......................... G06F 7/505 |
| | | 708/670 |
| 2018/0321938 A1 | 11/2018 | Boswell et al. |
| 2018/0365099 A1 | 12/2018 | Schwartz et al. |

OTHER PUBLICATIONS

Townsend et al., "A Comparison of Dadda and Wallace Multiplier Delays", Proc. SPIE, Adv. Signal Process, Algorithms, Archit., Implement. XIII, vol. 5205, pp. 552-560, Dec. 2003, doi: 10.1117/12.507012).
Hoang et al., "A High-Speed, Energy-Efficient Two-Cycle Multiply-Accumulate (MAC) Architecture and Its Application to a Double-Throughput MAC Unit", IEEE Transactions on Circuits and System-I: Regular Papers, vol. 57, No. 12, Dec. 2010.

* cited by examiner

ARITHMETIC CIRCUIT, AND NEURAL PROCESSING UNIT AND ELECTRONIC APPARATUS INCLUDING THE SAME

CROSS-REFERENCE TO RELATED APPLICATION(S)

This U.S. non-provisional application claims benefit of priority under 35 USC 119(a) to Korean Patent Application No. 10-2019-0108893 filed on Sep. 3, 2019 in the Korean Intellectual Property Office, the disclosure of which is incorporated by reference in its entirety herein.

BACKGROUND

1. Technical Field

The present inventive concept relates to an arithmetic circuit, and to a neural processing unit and an electronic apparatus including the same.

2. Discussion of Related Art

Machine learning is a field of study that harnesses principles of computer science and statistics to create statistical models for making predictions about the future based on data about the past and discovering patterns in data. A multiply-accumulate operation computes the product of two numbers and adds the product to an accumulator. Machine learning may require numerous multiply-accumulate (MAC) operations. That is, MAC operations may take up most of the processes of performing machine learning. A neural processing unit is a circuit that implements all the necessary control and arithmetic logic necessary to execute machine learning algorithms. Thus, a neural processing unit that performs machine learning may also include arithmetic circuits to process a large number of MAC operations.

Arithmetic circuits are usually designed using a pipelining method, which require a large number of flip-flops due to feedforward-cutset rules, which may increase a size and power consumption of a chip housing the circuits.

SUMMARY

At least one exemplary embodiment of the present inventive concept provides an arithmetic circuit capable of minimizing the size and power consumption of a chip housing a MAC arithmetic circuit for a neural processing unit.

According to an exemplary embodiment of the present inventive concept, an arithmetic circuit includes an input buffer latching each of a plurality of input signals, sequentially input, and sequentially outputting a plurality of first addition signals and a plurality of second addition signals based on the plurality of input signals, a first ripple carry adder (RCA) performing a first part of an accumulation operation on the plurality of first addition signals to generate a first sum signal and a carry, a flip-flop, a second RCA performing a second part of an accumulation operation on the plurality of second addition signals and an output of the flip-flop to generate a second sum signal, the second RCA latching the carry in the flip-flop after the accumulation operation is performed, and an output buffer latching the first sum signal and the second sum signal, and outputting a total sum signal representing a sum of the plurality of input signals. The output buffer may output at least one or more invalid signals before outputting a valid signal.

According to an exemplary embodiment of the present inventive concept, a neural processing unit includes a multiplier receiving an n-bit first signal and an m-bit second signal and outputting a value generated by multiplying the first signal by the second signal, an input buffer latching each of a plurality of input signals, sequentially input from the multiplier, and sequentially outputting a plurality of first addition signals and a plurality of second addition signals according to each of the plurality of input signals, a first ripple carry adder (RCA) performing a first part of an accumulation operation on the plurality of first addition signals to generate a first sum signal and a carry, a first flip-flop, a second RCA performing a second part of an accumulation operation on the plurality of second addition signals and an output of the flip-flop to generate a second sum signal, and an output buffer latching the first sum signal and the second sum signal, and outputting a total sum signal representing a sum of the plurality of input signals. The output buffer may output at least one or more invalid signals before outputting the total sum signal.

According to an exemplary embodiment of the present inventive concept, an electronic device includes a memory storing data for machine learning, and a neural processing unit an arithmetic circuit, and performing machine learning using the data. The arithmetic circuit includes an input buffer latching each of a plurality of input signals, sequentially input, and sequentially outputting a plurality of first addition signals and a plurality of second addition signals according to each of the plurality of input signals, a first ripple carry adder (RCA) performing a first part of an accumulation operation on the plurality of first addition signals to generate a first sum signal and a carry, a flip-flop, a second RCA performing a second part of the accumulation operation on the plurality of second addition signals and an output of the flip-flop to generate a second sum signal, and an output buffer latching the first sum signal and the second sum signal, and outputting a sum signal.

BRIEF DESCRIPTION OF DRAWINGS

Embodiments of the present disclosure will be more clearly understood from the following detailed description, taken in conjunction with the accompanying drawings, in which.

DETAILED DESCRIPTION OF THE EXEMPLARY EMBODIMENTS

Hereinafter, exemplary embodiments of the present disclosure will be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Figure 1:
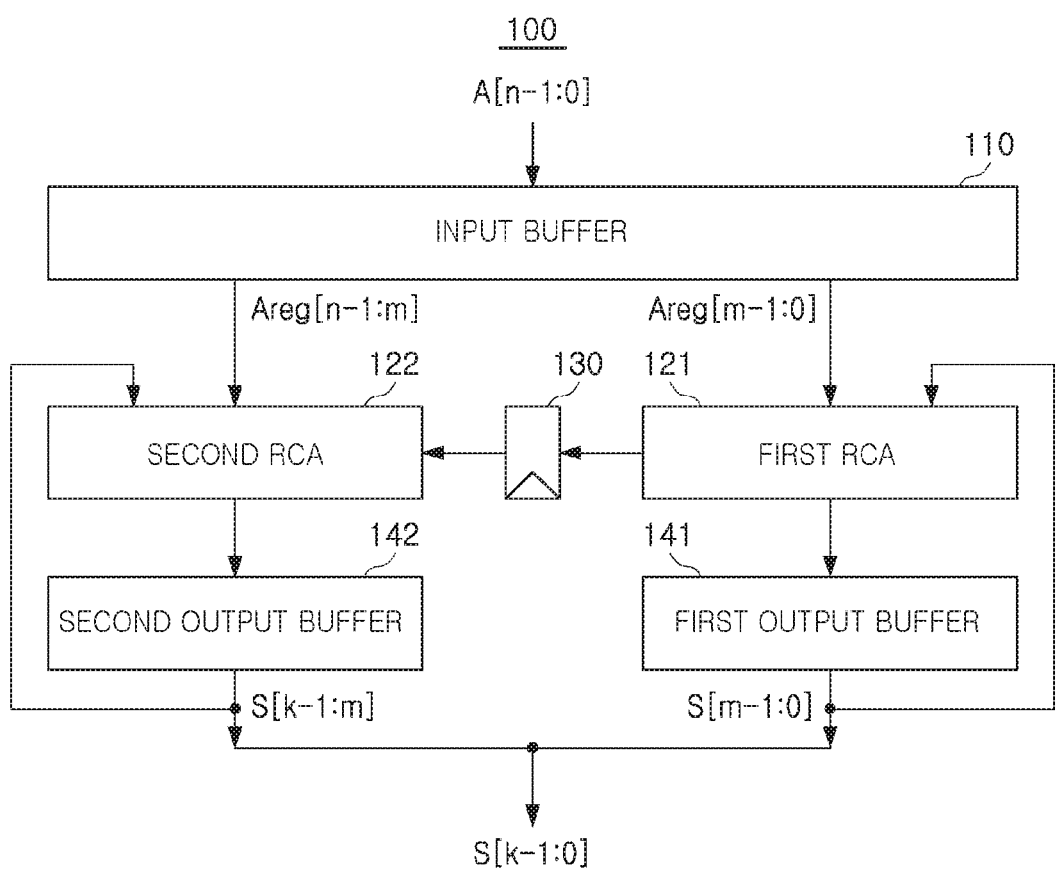
FIG. 1 is a schematic block diagram illustrating an arithmetic circuit according to an exemplary embodiment of the present inventive concept.

FIG. 1 is a schematic block diagram illustrating an arithmetic circuit according to an exemplary embodiment of the present inventive concept.

Referring to FIG. 1, an arithmetic circuit 100 includes an input buffer 110, a first ripple carry adder (RCA) (e.g., a logic circuit), a second RCA 122 (e.g., a logic circuit), a first output buffer 141, and a second output buffer 142.

The input buffer 110 receives an input signal (A[n-1:0]), and outputs a first addition signal (Areg[m-1:0]) and a second addition signal (Areg[n-1:m]). The input buffer 110 may operate in response to a clock signal. For example, the input buffer 110 may output its contents in response to the clock signal.

The first RCA 121 accumulates the first addition signal (Areg[m-1:0]), sequentially input, to generate a first sum signal (S[m-1]:0) and a carry.

The flip-flop 130 (e.g., a latch circuit) may transfer the carry generated by the first RCA 121 to the second RCA 122. The flip-flop 130 may operate in response to a clock signal.

The second RCA 122 may add the carry generated by the first RCA 121 to a value generated by sequentially accumulating the second addition signal (Areg[n-1:m]), sequentially input, to generate a second sum signal (S[k-1:m]).

The first output buffer 141 latches the first sum signal (S[m-1:0]) generated by the first RCA 121. The first output buffer 141 may output the latched first sum signal (S[m-1:0]). For example, the first output buffer 141 may output the latched first sum signal (S[m-1:0]) in response to receiving a control signal or clock signal.

The second output buffer 142 latches the second sum signal (S[k-1:m]) generated by the second RCA 122. The second output buffer 142 may output the latched second sum signal (S[k-1:m]). For example, the second output buffer 142 may output the latched second sum signal (S[k-1:m]) in response to receiving a control signal or clock signal. A k-bit sum signal (S[k-1:0]) may be generated from the first sum signal (S[m-1:0]) and the second sum signal (S[k-1:m]).

As described above, the arithmetic circuit 100 may accumulate an n-bit input signal (A[n-1:0]), sequentially input, to generate a k-bit sum signal (S[k-1:0]). Here, n may be an integer, greater than or equal to 1, k may be an integer, greater than or equal to n, and m may be an integer, smaller than k.

When k is greater than n, an upper (k-n) bit (that is, Areg[k-1:n]) of the second addition signal (Areg[k-1:m]) may be generated by performing signal extension.

As shown in FIG. 1, the arithmetic circuit 100 may be implemented by pipelining. However, the arithmetic circuit 100 according to an exemplary embodiment of the present inventive concept, among edges to which a flip-flop should be added by a feedforward-cutset rule, the flip-flop need not be added to an edge not corresponding to a critical path. That is, the arithmetic circuit 100 according to an exemplary embodiment of the present inventive concept may be implemented by pipelining, and flip-flops may be added only to the critical path without following the feed-forward cut set rule. The critical path may be a path that is directly associated with a portion in which an actual operation is performed, and may be a path that determines a clock speed of a neural processing unit (NPU) in which the arithmetic circuit 100 is used.

Figure 2:
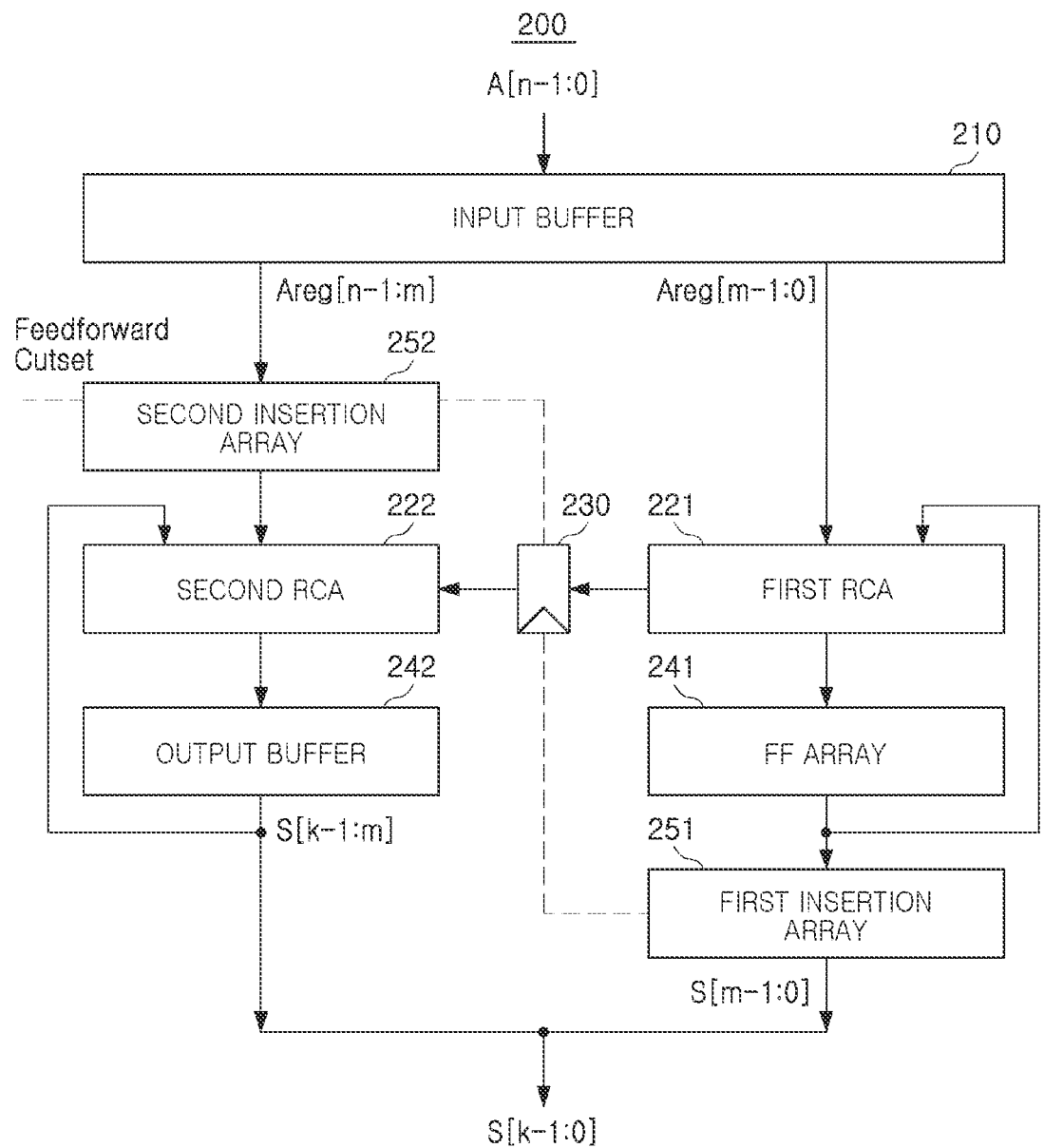
FIG. 2 is a schematic block diagram illustrating an arithmetic circuit of a Comparative Example.

FIG. 2 is a schematic block diagram illustrating an arithmetic circuit of Comparative Example. An arithmetic circuit 200 of the Comparative Example includes an input buffer 210, a first RCA 221, a second RCA 222, a flip-flop 230, a flip-flop array 241, an output buffer 242, a first insertion array 251, and a second insertion array 252.

Functions of the input buffer 210, the first RCA 221, the second RCA 222, the flip-flop 230, the flip-flop array 241, and the output buffer 242 may be the same as the input buffer 110, the first RCA 121, the second RCA 122, the flip-flop 130, the first output buffer 141, and the second output buffer 142.

The first insertion array 251 and the second insertion array 252 may operate in response to a clock signal, and may latch and output an input signal.

That is, the arithmetic circuit 200 of the Comparative Example may be the same as the arithmetic circuit 100 of FIG. 1 except that the first insertion array 251 and the second insertion array 252 are added.

Table 1 below is for illustrating operations of the arithmetic circuit 100 according to an exemplary embodiment of the present inventive concept shown in FIG. 1 and the arithmetic circuit 200 of the Comparative Example shown in FIG. 2. For example, n and k may be both 32, and m may be 16. In Table 1, an addition signal (Areg) and a sum signal S are represented in hexadecimal.

TABLE 1

| | | Comparative Example | | | Example embodiment(FIG. 1) | | |
|---|---|---|---|---|---|---|---|
| Clock | | [31:16] | [15:0] | C | [31:16] | [15:0] | C |
| Cycle 1 | Areg | 7325 | AB2C | — | 7325 | AB2C | — |
| | S | 0000 | 0000 | | 0000 | 0000 | |
| Cycle 2 | Areg | 4823 | F135 | — | 4823 | F135 | — |
| | S | 0000 | 0000 | | 7325 | AB2C | |
| Cycle 3 | Areg | 2823 | F432 | — | 2823 | F432 | 1 |
| | S | 7325 | AB2C | | BB48 | 9C61 | |
| Cycle 4 | Areg | 0000 | 0000 | 1 | 0000 | 0000 | 1 |
| | S | BB49 | 9C61 | | E36C | 9093 | |
| Cycle 5 | Areg | 0000 | 0000 | 1 | 0000 | 0000 | — |

First, when the operation of the Comparative Example of FIG. 2 is described with reference to Table 1, in Cycle 1, a first input value [7325 AB2C] (hereinafter, A1) is output from the input buffer 210. An upper 16 bits of A1 is latched in the second insertion array 252, and a lower 16 bits of A1 is input to the first RCA 221. The first RCA 221 performs an accumulation operation to output a result thereof, and an output of the first RCA 221 (that is, the lower 16 bits of A1) is latched in the flip-flop array 241.

In cycle 2, a value latched in the second insertion array 252 in cycle 1 (that is, the upper 16 bits of A1) is output from the second insertion array 252 and input to the second RCA 222, and the second RCA 222 performs an accumulation operation to output a result thereof, and an output of the second RCA 222 (that is, the upper 16 bits of A1) is latched in the output buffer 242. In addition, the value latched in the flip-flop array 241 (that is, the lower 16 bits of A1) in cycle 1 is output from the flip-flop array 241 and latched in the first insertion array 251.

In cycle 2, a second input value [4823 F135] (hereinafter, A2) is output from the input buffer 210, and an upper 16 bits of A2 is latched in the second insertion array 252, and a lower 16 bits of A2 is input to the first RCA 221. The first RCA 221 performs an accumulation operation to output a result thereof, the output of the first RCA 221 (that is, a sum of the lower 16 bits of A1 output from the flip-flop array 251 and the lower 16 bits of A2 output from the input buffer 210) is latched in the flip-flop array 241. A carry generated in the first RCA 221 may be latched in the flip-flop 230.

In cycle 3, a value latched in the output buffer 242 in cycle 2 (that is, the upper 16 bits of A1) and a value latched in the first insertion array 251 (that is, the lower 16 bits of A1) in cycle 2 is output. That is, a sum signal (S[31:0]) output in cycle 3 may be A1 in cycle 1.

In cycle 3, a value latched in the second insertion array 252 in cycle 2 (that is, the upper 16 bits of A2) is output from the second insertion array 252 and input to the second RCA 222. The second RCA 222 performs an accumulation operation to output a result thereof, and the output of the second RCA 222 (that is, a sum of the upper 16 bits of A1 output from the output buffer 242 and the upper 16 bits of A2 output from the second insertion array 252) is latched in the output buffer 242. In addition, a value latched in the flip-flop array 241 in cycle 2 (that is, a sum of the lower 16 bits of A1 and the lower 16 bits of A2) is output from the flip-flop array 241 and latched in the first insertion array 251.

In cycle 3, a third input value [2823 F432] (hereinafter, A3) is output from the input buffer 210, and an upper 16 bits of A3 is latched in the second insertion array 252, and a lower 16 bits of A3 is input to the first RCA 221. The first RCA 221 performs an accumulation operation to output a result thereof, and an output of the first RCA 221 (that is, a sum of the lower 16 bits of A1 and the lower 16 bits of A2 and the lower 16 bits of A3) is latched in the flip-flop array 241. A carry generated in the first RCA 221 may be latched in the flip-flop 230.

In cycle 4, a value in which the carry stored in the flip-flop 230 is added to the value latched in the output buffer 242 in cycle 3 and a value latched in the first insertion array 251 (that is, a sum of the lower 16 bits of A1 and the lower 16 bits of A2) is output. That is, a sum signal (S[31:0]) output in cycle 4 may be a sum of A1 and A2.

In cycle 4, a value latched in the second insertion array 252 in cycle 3 (that is, the upper 16 bits of A3) is output from the second insertion array 252 and input to the second RCA 222. The second RCA 222 performs an accumulation operation to output a result thereof, and an output of the second RCA 222 (that is, a sum of the upper 16 bits of A1 and the upper 16 bits of A2 and the upper 16 bits of A3) is latched in the output buffer 242. In addition, a value latched in the flip-flop array 241 in cycle 3 (that is, a sum of the lower 16 bits of A1 and the lower 16 bits of A2 and the lower 16 bits of A3) is output from the flip-flop array 241 and latched in the first insertion array 251.

In cycle 5, a value in which the carry stored in the flip-flop 230 is added to the value latched in the output buffer 242 in cycle 4 (that is, a sum of the upper 16 bits of A1 and the upper 16 bits of A2 and the upper 16 bits of A3) and a value latched in the first insertion array 251 (that is, a sum of the lower 16 bits of A1 and the lower 16 bits of A2 and the lower 16 bits of A3) is output. That is, a sum signal (S[31:0]) output in cycle 5 may be a sum of A1, A2, and A3.

Next, an operation of an exemplary embodiment of the present inventive concept shown in FIG. 1 will be described.

In cycle 1, a first input value [7325 AB2C] (hereinafter, A1) is output from the input buffer 110. The lower 16 bits of A1 are input to the first RCA 121, the first RCA 121 performs an accumulation operation to output a result thereof, and an output of the first RCA 121 (that is, the lower 16 bits of A1) is latched in the first output buffer 141. The upper 16 bits of A1 are input to the second RCA 122, the second RCA 122 performs an accumulation operation to output a result thereof, and an output of the second RCA 122 (that is, the upper 16 bits of A1) is latched in the second output buffer 142.

In cycle 2, the value latched in the second output buffer 142 and the first output buffer 141 in cycle 1 are output as a sum signal (S[31:0]).

In addition, in cycle 2, a second input value [4823 F135] (hereinafter, A2) is output from the input buffer 110. The upper 16 bits of A2 are input to the second RCA 122, and the lower 16 bits of A2 are input to the first RCA 121. The first RCA 121 performs an accumulation operation to output a result thereof, and an output of the first RCA 121 (that is, a sum of the lower 16 bits of A1 and the lower 16 bits of A2) is latched in the first output buffer 141. A carry generated in the first RCA 121 is latched in the flip-flop 130. The second RCA 122 performs an accumulation operation to output a result thereof, and an output of the second RCA 122 (that is, a sum of the upper 16 bits of A1 and the upper 16 bits of A2) is latched in the second output buffer 142.

In cycle 3, the value latched in the second output buffer 142 and the first output buffer 141 in cycle 2 is output as a sum signal (S[31:0]). However, since the carry generated in the first RCA 121 has not been added, the sum signal (S[31:0]) output in cycle 3 is a value independent of A1 and A2 (that is, an invalid value). For example, the sum signal is generated without considering the carry resulting from adding the lower 16 bits of A1 to the lower bits of A2. For example, if the resulting carry is 1, the sum signal is generated by considering a carry of 0.

In cycle 3, a third input value [2823 F432] (hereinafter, A3) is output from the input buffer 110, and the upper 16 bits of A3 are input to the second RCA 122, and the lower 16 bits of A3 are input to the first RCA 121. The first RCA 121 performs an accumulation operation to output a result thereof, and an output of the first RCA 121 (that is, a sum of the lower 16 bits of A1 and the lower 16 bits of A2 and the lower 16 bits of A3) is latched in the first output buffer 141. The carry generated in the first RCA 121 is latched in the flip-flop 130. The second RCA 122 performs an accumulation operation to output a result thereof, and an output of the second RCA 122 (that is, a sum of the upper 16 bits of A1 and the upper 16 bits of A2 and the upper 16 bits of A3) is latched in the second output buffer 142.

In cycle 4, a value in which the carry generated in the first RCA 121 is cycle 2 is added to the value latched in the second output buffer 122 in cycle 3 and a value latched in the second output buffer 142 are output as a sum signal (S[31:0]). However, since the carry generated in the first RCA 121 in cycle 3 is not added, the sum signal (S[31:0]) output in cycle 3 is a value independent of A1, A2, and A3 (that is, invalid values). For example, while the sum signal does consider the carry resulting from adding the lower 16 bits of A1 to the lower 16 bits of A2, it does not further consider the carry resulting from adding the lower 16 bits of A2 to the lower 16 bits of A3. The sum signal (S[31:0]) output in cycle 3 is latched in the first output buffer 141 and the second output buffer 142.

In cycle 5, a value in which the carry generated in the first RCA 121 in cycle 3 is added to the value latched in the first output buffer 142 in cycle 4 and a value latched in the second output buffer 141 are output as a sum signal (S[31:0]). Therefore, the sum signal (S[31:0]) output in cycle 5 is a value of summing A1 and A2 and A3, and is a valid value. For example, the carry resulting from adding the lower 16 bits of A2 to the lower 16 bits of A3 is added to the sum signal generated in cycle 4.

Figure 3A:
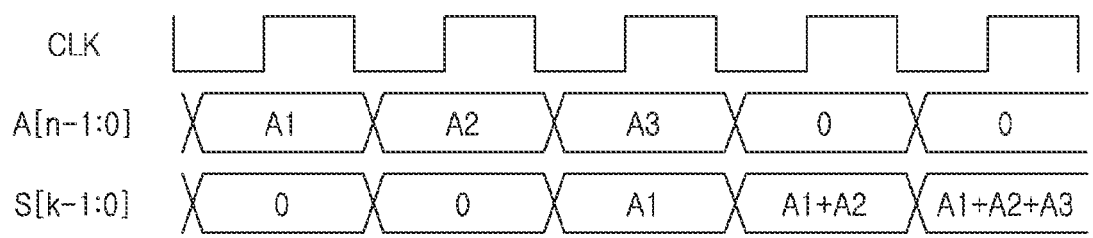
FIG. 3A is a view illustrating operations of an arithmetic circuit according to the Comparative Example.
Figure 3B:
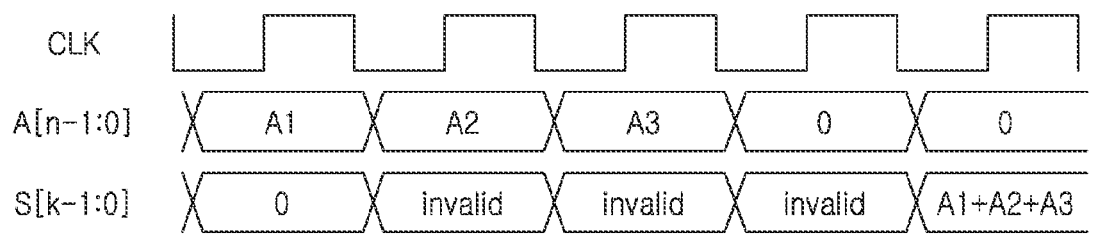
FIG. 3B is a view illustrating operations of an arithmetic circuit according to an exemplary embodiment of the inventive concept.

FIG. 3A is a view illustrating operations of an arithmetic circuit according to the Comparative Example and FIG. 3B is a view illustrating operations of an arithmetic circuit according to an exemplary embodiment of the inventive concept.

Referring to FIG. 3A and Table 1, in the Comparative Example of FIG. 2, since pipelining was performed according to a feedfoward cutest rule, A1, A1+A2, and A1+A2+A3 may be sequentially output from a third clock cycle.

In contrast, in an exemplary embodiment of the present inventive concept of FIG. 1, a final value output in a fifth clock cycle is valid data (that is, A1+A2+A3), but the data output before that may be invalid data. In other words, in the exemplary embodiment of the present inventive concept of FIG. 1, the final value may be a valid value as long as a plurality of data are continuously input every clock cycle (FIG. 3B).

For certain neural network algorithms, an intermediate result of the operation is not needed, and only the final result of the operation is needed. Therefore, when the arithmetic circuit of the present inventive concept is applied to a neural processing unit, the number of flip-flops may be greatly reduced, so that not only the chip size may be reduced but also the power consumption may be reduced.

Figure 4:
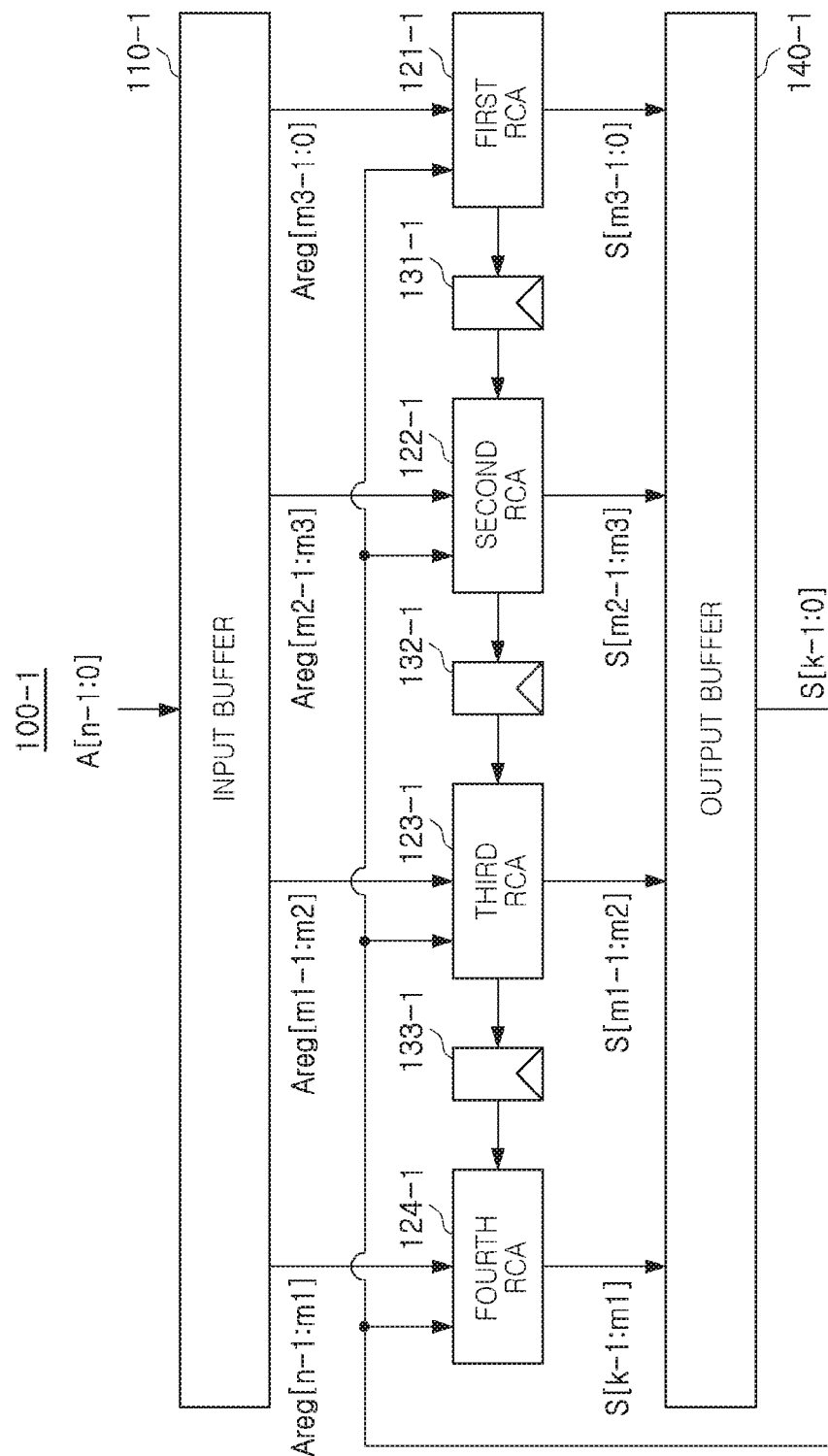
FIGS. 4 to 7 are schematic block diagrams illustrating an arithmetic circuit according to an exemplary embodiment of the present inventive concept.

FIG. 4 is a schematic block diagram illustrating an arithmetic circuit according to an exemplary embodiment of the present inventive concept.

Referring to FIG. 4, an arithmetic circuit 100-1 according to an exemplary embodiment of the present inventive concept includes an input buffer 110-1, a first RCA 121-1, a second RCA 122-1, a third RCA 123-1, a fourth RCA 124-1, a first flip-flop 131-1, a second flip-flop 132-1, a third flip-flop 133-1, and an output buffer 140-1.

The input buffer 110-1 receives an input signal (A[n-1:0]), and outputs a first addition signal (Areg[m3-1:0]), a second addition signal (Areg[m2-1:m3]), a third addition signal (Areg[m1-1:m2]), and fourth addition signal (Areg[n-1:m1]). The first RCA 121-1 accumulates the first addition signal (Areg[m3-1:0]), sequentially input, to generate a first sum signal (S[m3-1]:0) and a first carry. The second RCA 122-1 may add the first carry generated by the first RCA 121-1 to a value generated by sequentially accumulating the second addition signal (Areg[m2-1:m3]), sequentially input, to generate a second sum signal (S[m2-1:m3]) and a second carry. The third RCA 123-1 may add the second carry generated by the second RCA 122-1 to a value generated by sequentially accumulating the third addition signal (Areg[m1-1:m2]), sequentially input, to generate a third sum signal (S[m1-1:m2]) and a third carry. The fourth RCA 12401 may add the third carry generated by the third RCA 123-1 to a value generated by sequentially accumulating the fourth addition signal (Areg[n-1:m1]), sequentially input, to generate a fourth sum signal (S[k-1:m1]). A k-bit sum signal (S[k-1:0]) or a total sum signal may be generated from the first sum signal (S[m3-1:0]), the second sum signal (S[m2-1:m3]), the third sum signal (S[m1-1:m2]), and the fourth sum signal (S[k-1:m1]).

An exemplary embodiment of the present inventive concept of FIG. 4 is the same as the exemplary embodiment of the present inventive concept shown in FIG. 1 except that the number of RCAs is four and the number of flip-flops inserted for pipelining is three. That is, according to an exemplary embodiment of the present inventive concept, the flip-flops 131-1, 132-1, and 133-1 are inserted only between the first to fourth RCAs 121-1, 122-1, 123-1, and 124-1 during pipelining. As described above, the final result value may be a valid value even when implemented as shown in FIG. 4. Therefore, the arithmetic circuit 100-1 according to an exemplary embodiment of the present inventive concept may have characteristics suitable for neural processing units while reducing the chip size and the power consumption.

Figure 5:
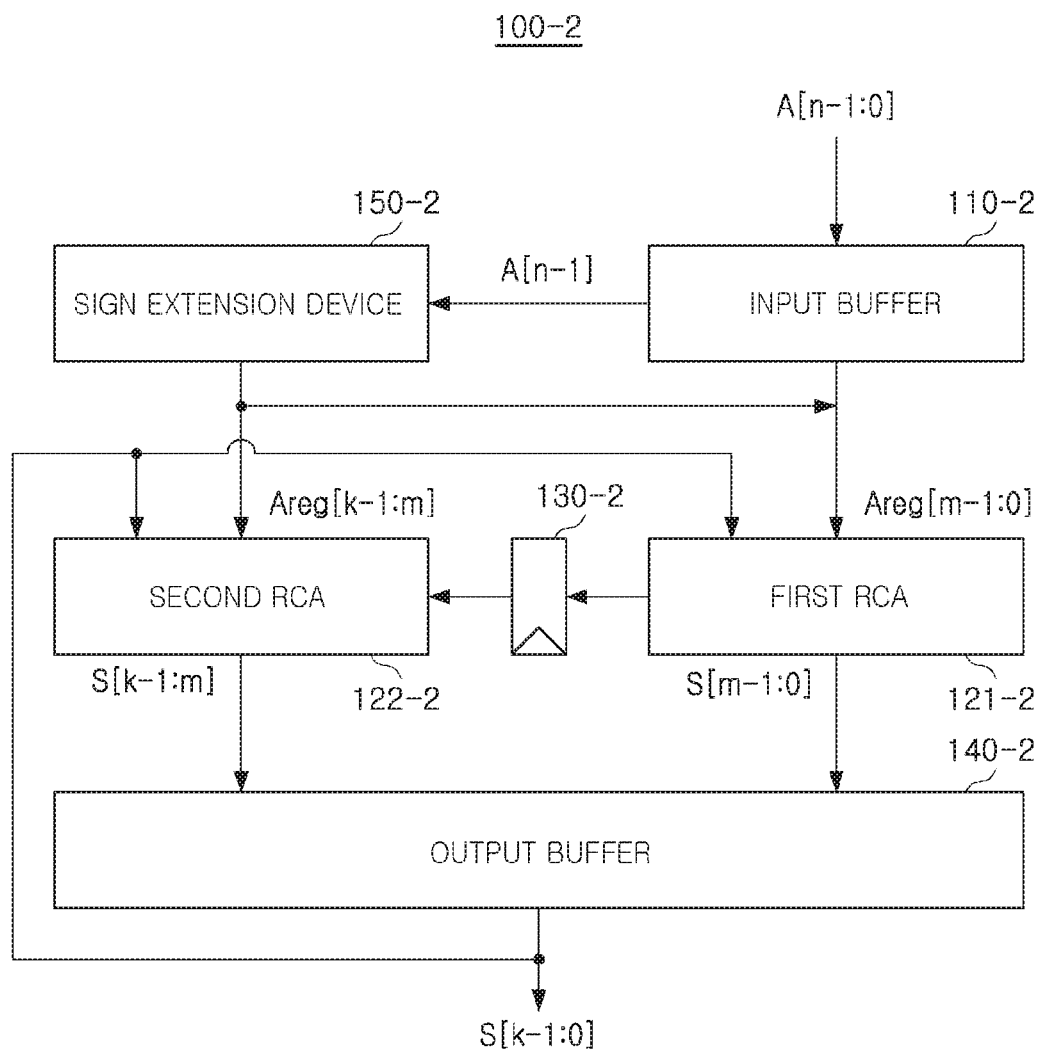

FIG. 5 is a schematic block diagram illustrating an arithmetic circuit according to an exemplary embodiment of the present inventive concept.

Referring to FIG. 5, an arithmetic circuit 100-2 includes an input buffer 110-2, a first RCA 121-2, a second RCA 122-2, a flip-flop 130-2, an output buffer 140-2, and a sign extension device 150-2 (e.g., a logic circuit).

Functions and operations of the input buffer 110-2, the first RCA 121-2, the flip-flop 130-2, and the output buffer 140-2 may be the same as those of the input buffer 110, the first RCA 121, the flip-flop 130, and the first and second output buffers 141 and 142 of FIG. 1.

In an exemplary embodiment, the sign extension device 150-2 generates extended bits, based on an uppermost bit (A[n-1]) of an input signal (A[n-1:0]). That is, when the uppermost bit (A[n-1]) is 1, the sign extension device 150-2 sets the values of bits of addition signals (Areg[k-1:n]) to 1, and when the uppermost bit (A[n-1] is 0, the sign extension device 150-2 sets the values of bits of addition signals (Areg[k-1:n]) to 0. The values of bits of addition signals (Areg[n-1:0]) may be the same as the values of bits of the input signal (A[n-1:0]).

As shown in FIG. 5, according to an exemplary embodiment of the present inventive concept, among edges to which a flip-flop should be inserted according to the feedfoward-cutset rule during pipelining, a flip-flop is inserted only to edges directly related to an actual operation (for example, between the first RCA 121-2 and the second RCA 122-2 in FIG. 5). However, in this case, an undesired transition may occur.

Table 2 below is for illustrating a process of performing an operation of adding decimal numbers, which are 7 and −4, in the Comparative Example and the exemplary embodiment of FIG. 5, were n and m are 4, and k is 8 in FIG. 5.

In Table 2, Areg [7:4] are bits generated by the sign extension device (150-2 in FIG. 5), and negative numbers are represented by 2's complement.

TABLE 2

| Clock | | Comparative Example | | | Example embodiment (FIG. 5) | | |
|---|---|---|---|---|---|---|---|
| | | [7:4] | [3:0] | C | | [7:4] | [3:0] | C |
| Cycle 1 | Areg | 0000 | 0111 | — | Areg | 0000 | 0111 | — |
| | S | 0000 | 0000 | | S | 0000 | 0000 | |
| Cycle 2 | Areg | 1111 | 1100 | — | Areg | 1111 | 1100 | — |
| | S | 0000 | 0000 | | S | 0000 | 0111 | |
| Cycle 3 | Areg | 0000 | 0000 | — | Areg | 0000 | 0000 | 1 |
| | S | 0000 | 0111 | | S | 1111 | 0011 | |
| Cycle 4 | Areg | 0000 | 0000 | 1 | Areg | 0000 | 0000 | — |

The operation of the Comparative Example and the exemplary embodiment in each clock cycle will be readily understood by referring to the description in Table 1.

As shown in Table 2, in the exemplary embodiment of FIG. 5, it can be seen that an undesired transition occurred in cycle 3.

That is, according to an exemplary embodiment of the present inventive concept, since the carry generated in the operation of the lower bits is added to the sum of the upper bits after one clock cycle, an undesired transition may occur in the case shown in Table 2.

Figure 6:
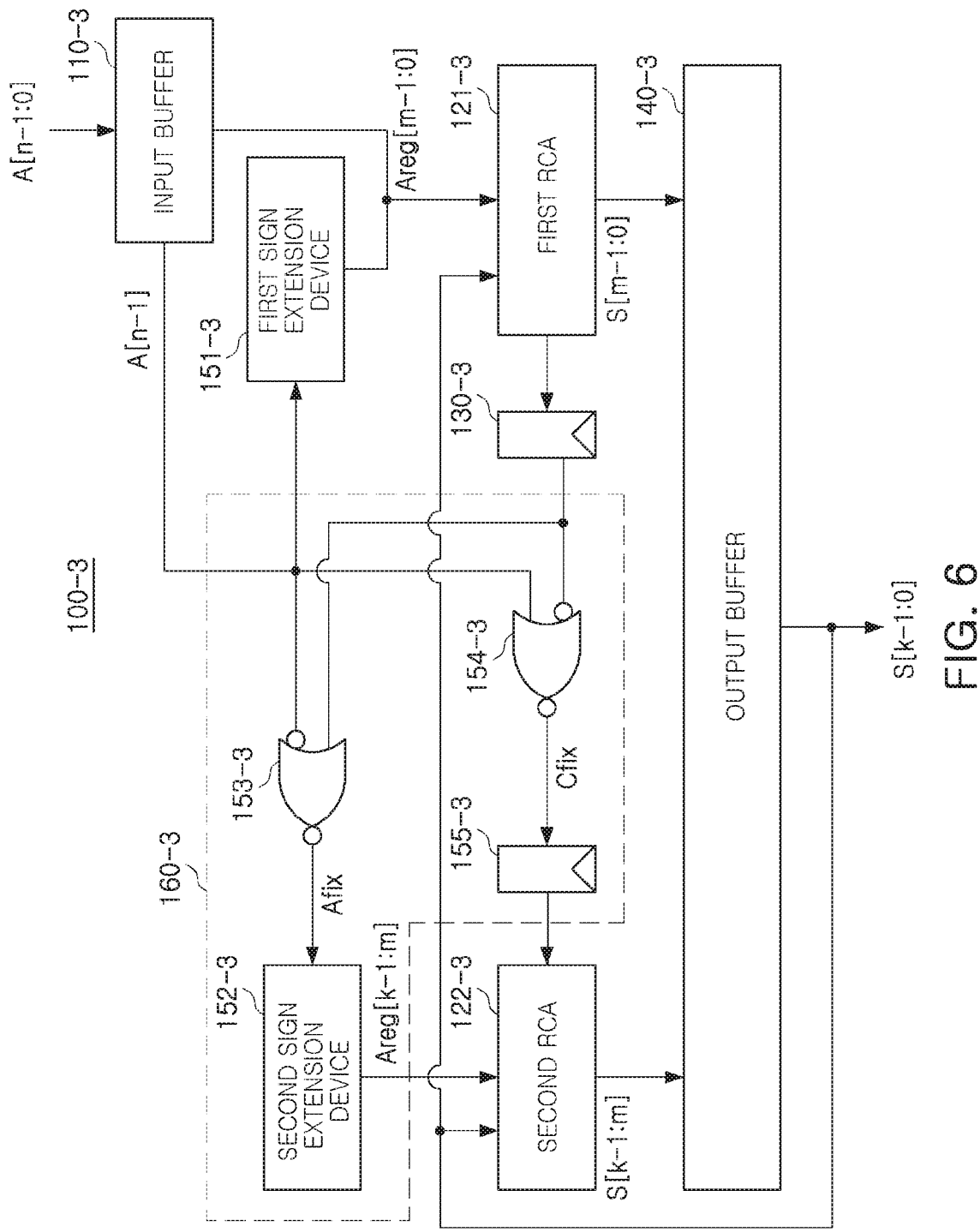

FIG. 6 is a schematic block diagram illustrating an arithmetic circuit according to an exemplary embodiment of the present inventive concept.

Referring to FIG. 6, an arithmetic circuit 100-3 according to an exemplary embodiment of the present inventive concept includes an input buffer 110-3, a first RCA 121-3, a second RCA 122-3, a flip-flop 130-3, an output buffer 140-3, a first sign extension device 151-3, and a transition prevention unit 160-3. The transition prevention unit 160-3 may include a second sign extension device 152-3, a first logic element 153-3, a second logic element 154-3, and a flip-flop 155-3.

Functions and operations of the input buffer 110-3, the first RCA 121-3, the second RCA 122-3, the flip-flop 130-3, and the output buffer 140-3 may be the same as the functions and operations of the input buffer 110, the first RCA 121, the second RCA 122, the flip-flop 130, and the first and second output buffers 141 and 142.

The function and operation of the first sign extension device 151-3 may be the same as the function and operation of the sign extension device 150-2 described with reference to FIG. 5. However, when n is greater than or equal to m, the first sign extension device 151-3 may be omitted.

The transition prevention unit 160-3 may prevent an improper switching of a sum signal (S[k-1:0]) in response to an uppermost bit (A[n-1]) of an input signal (A[n-1:0]) and a carry generated in the first RCA 121-3. The transition prevention unit 160-3 may include a first logic element 153-3 outputting 1, only when the uppermost bit (A[n-1]) of the input signal (A[n-1:0]) is 1 and the carry generated from the first RCA 121-3 is 0, and outputting 0 otherwise, a second sign extension device 152-3 copying a sign bit of an upper bit (that is, Areg[k-1:m]) according to an output signal of the first logic element 153-3, a second logic element 154-3 outputting 1 only when the uppermost bit (A[n-1]) of the input signal (A[n-1:0]) is 0, and the generated carry is 1, and outputting 0 otherwise, and a flip-flop 155-3 latching an output signal of the second logic element 154-3 in response to a clock signal, and outputting the output signal to the second RCA 122-3.

That is, if the carry generated in the first RCA 121-3 is "1", even when the value of the uppermost bit (A[n-1]) of the input signal (A[n-1:0]) is "1", the transition prevention unit 160-3 does not allow the second sign extension device 152-3 to make the values of the upper bits of the addition signal become "1". Therefore, an unintended transition occurring in cycle 3 of Table 2 may be prevented.

Figure 7:
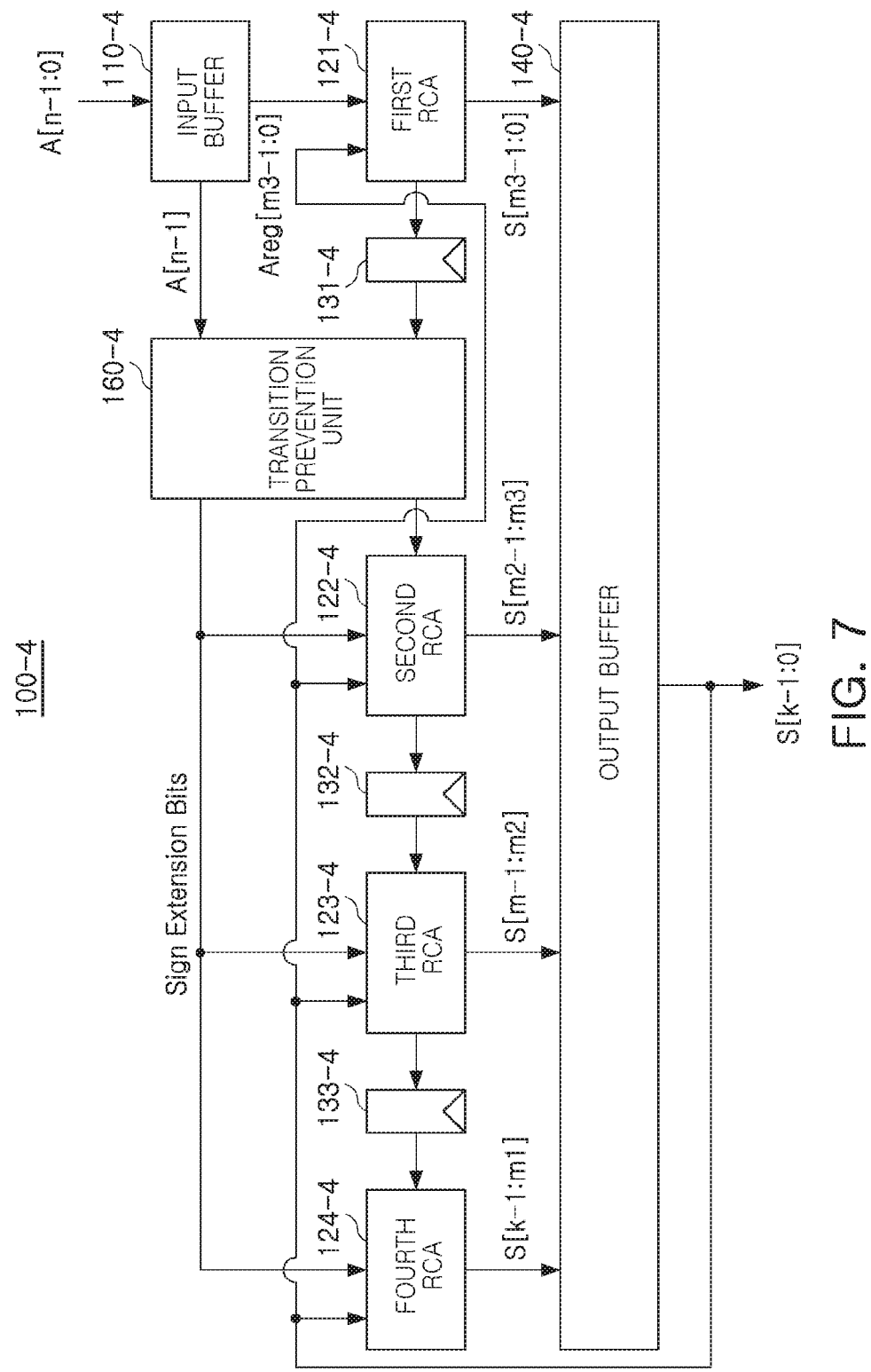

FIG. 7 is a schematic block diagram illustrating an arithmetic circuit according to an exemplary embodiment of the present inventive concept.

Referring to FIG. 7, an arithmetic circuit 100-4 include an input buffer 110-4, first to fourth RCAs 121-4 to 124-4, first to third flip-flops 131-4 to 133-4, an output buffer 140-4, and a transition prevention unit 160-4.

Functions and operations of each of the input buffer 110-4, the first to fourth RCAs 121-4 to 124-4, the first to third flip-flops 131-4 to 133-4, and the output buffer 140-4 will be readily understood by referring to the functions and operations of the input buffer 110, the first and second RCAs 121 and 122, the flip-flop 130, and the output buffer 140. The configuration, function, and operation of the transition prevention unit 160-4 may be the same as the transition prevention unit 160-3 described with reference to FIG. 6.

That is, the arithmetic circuit 100-4 of FIG. 7 may be the same as the arithmetic circuit 100-3 of FIG. 6 except that the number of RCAs and flip-flops is increased.

Figure 8:
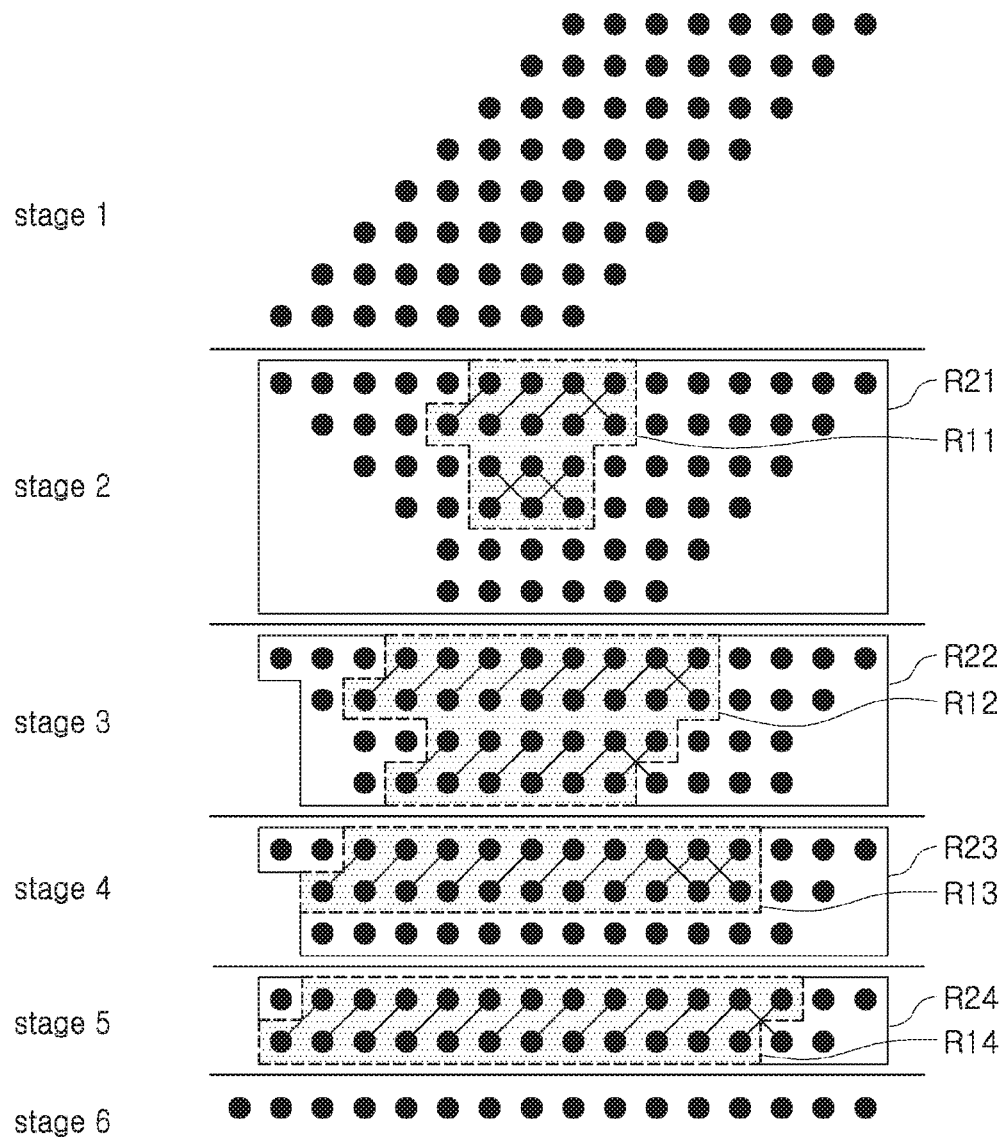
FIG. 8 is a view illustrating a MAC operation process using an arithmetic circuit according to an exemplary embodiment of the present inventive concept.

FIG. 8 is a view illustrating a MAC operation process using an arithmetic circuit according to an exemplary embodiment of the present inventive concept.

A neural network according to an exemplary embodiment of the present inventive concept may perform a MAC operation using a neural processing unit including the arithmetic circuit described above with reference to FIGS. 1 to 7 and a predetermined multiplier. In san exemplary embodiment, the multiplier used in the MAC operation includes a dadda multiplier. However, this is merely an example, and exemplary embodiments of the present inventive concept are not limited thereto. Hereinafter, the MAC operation process will be described on a premise that the multiplier is a dada multiplier.

Referring to FIG. 8, a target height of stage 2 is 6, a target height of stage 3 is 4, a target height of stage 4 is 3, and a target height of stage 5 is 2.

Regions R11, R12, R13, and R14 represent bits for which the operation is performed to satisfy the target height, where a hatched mark (/) represent bits in which the operation is performed by a half adder, and an X mark (X) represents bits for which the operation is performed by a full adder.

According to an exemplary embodiment of the present inventive concept, flip-flops are inserted only at the bits for which the operation is performed, that is, only at edges associated with the predetermined regions R11, R12, R13, and R14.

Therefore, the number of flip-flops to be inserted may be reduced, thereby reducing the chip size and power consumption.

In FIG. 8, a case of multiplying an 8-bit signal by an 8-bit signal has been described as an example. However, the present inventive concept may be applied to a dadda multiplier in which an n-bit signal and an m-bit signal is multiplied (where, n and m are integers, greater than 0).

Figure 9:
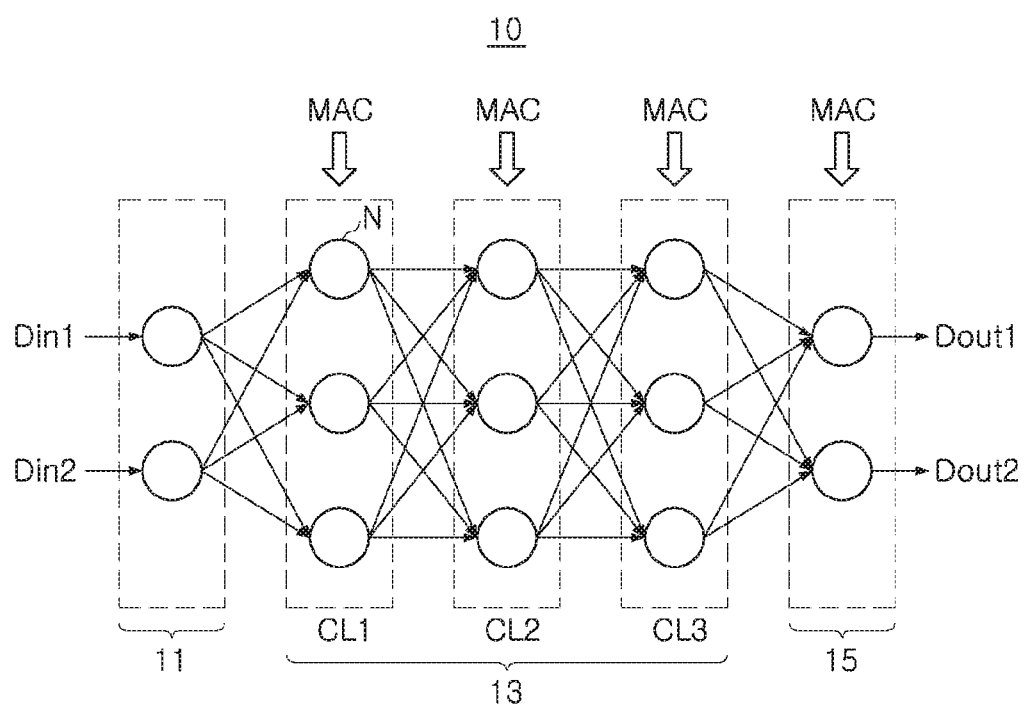
FIG. 9 is a view illustrating a structure of a neural network including an arithmetic circuit according to an exemplary embodiment of the present inventive concept.

FIG. 9 is a view illustrating a structure of a neural network including an arithmetic circuit according to an exemplary embodiment of the present inventive concept.

Referring to FIG. 9, a neural network 10 includes an input layer 11, a hidden layer 13, and an output layer 15.

Each layer of the neural network 10 may include a plurality of nodes N interconnected having a predetermined weight, and each node N may correspond to a neuron or a perceptron. For example, a neuron or a perceptron of a neural network is a computation unit that has one or more weighted input connections, a transfer function that combines the inputs, and an output connection.

The input layer 11 may transfer predetermined input data Din1 and Din2 to the hidden layer 13. The hidden layer 13 may include a plurality of convolution layers CL1 to CL3, and it is possible to perform a convolution operation on the input data Dint and Din2 transferred from the input layer 11 using a neural processing unit (NPU). In an exemplary embodiment, the convolution operation includes only multiply-accumulate (MAC) operations or includes mostly MAC operations. The output layer 15 may generate output data Dout1 and Dout2 of the neural network 10 based on a result of the convolution operation of the hidden layer 13.

In FIG. 9, it is illustrated that the input layer 11 includes two nodes, each layer of the hidden layer 13 includes three nodes, and the output layer 15 includes two nodes, but exemplary embodiments of the present inventive concept are not limited thereto. For example, the input layer 11 may include one node, each layer of the hidden layer 15 includes five nodes, and the output layer 15 may include three nodes.

Figure 10:
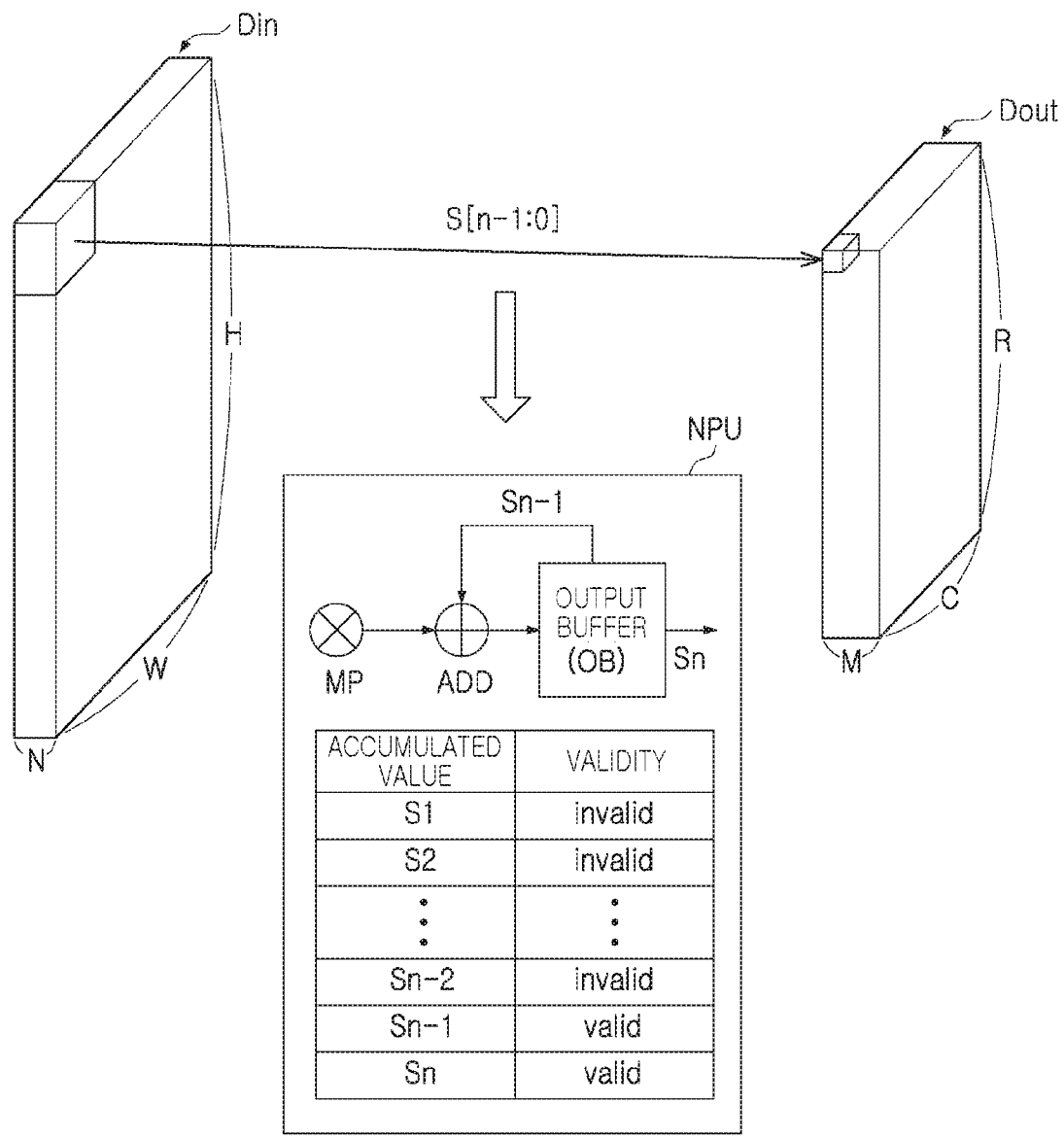
FIG. 10 is a view illustrating an MAC operation performed in each neural processing unit of FIG. 9.

FIG. 10 is a view illustrating a MAC operation process performed in each neural processing unit of FIG. 9.

Referring to FIG. 10, the neural processing unit NPU may perform a MAC operation on input data Din having a size of 'N(the number of channels)×W(data width)×H(data height)' to generate the sum signal (S[n-1:0]) described with reference to FIGS. 1 to 8. The neural processing unit NPU may repeatedly perform such a MAC operation to generate output data Dout having a size of 'M(the number of channels)×C(data width)'R(data height)'.

The neural processing unit NPU may have a structure in which an arithmetic circuit according to an exemplary embodiment of the present inventive concept is applied to a multiplier MP.

The multiplier MP may perform a multiplication operation on an input value and a weight value corresponding thereto. In an exemplary embodiment of the inventive concept, the multiplier MP is a dadda multiplier. However, it should be noted that exemplary embodiments of the present inventive concept are not limited thereto.

As described above with reference to FIG. 8, the multiplier MP may include a plurality of stages receiving an n-bit first signal and an m-bit second signal to output a value generated by multiplying the first signal by the second signal, and performing full addition or half addition on at least a portion of the bits to satisfy a predetermined target height.

The arithmetic circuit according to an exemplary embodiment of the present inventive concept may be represented by an adder ADD and an output buffer OB. The adder ADD may correspond to the ripple carry adder (RCA) described above with reference to FIGS. 1 to 7.

The adder ADD receives an output value of the multiplier MP to repeatedly perform an accumulation operation for a plurality of cycles. The plurality of cycles may be performed during the MAC operation, and a sum signal (S1-Sn) generated in each cycle by the adder ADD may be latched in the output buffer OB. In addition, the sum signal (S1-Sn) generated in each cycle may be fed back to the adder ADD and may be used to generate the sum signal (S1-Sn) in a subsequent cycle.

In the MAC operation, the neural processing unit NPU may output invalid data until a predetermined cycle (Sn-2), but outputs valid data after the corresponding cycle (Sn-1). Since the neural processing unit NPU outputs valid data generated after the predetermined cycle (Sn) as final data, invalid data generated in an intermediate process (S1 to Sn-2) is ignored. For some neural network algorithms, an intermediate result of the MAC operation is not needed, and only the final result of the operation is needed. In the arithmetic circuit according to an exemplary embodiment of the present inventive concept, using this characteristic, a flip-flop is only connected to a critical path directly associated with a portion where an actual operation is performed, without following the feedforward-cutset rule.

Figure 11:
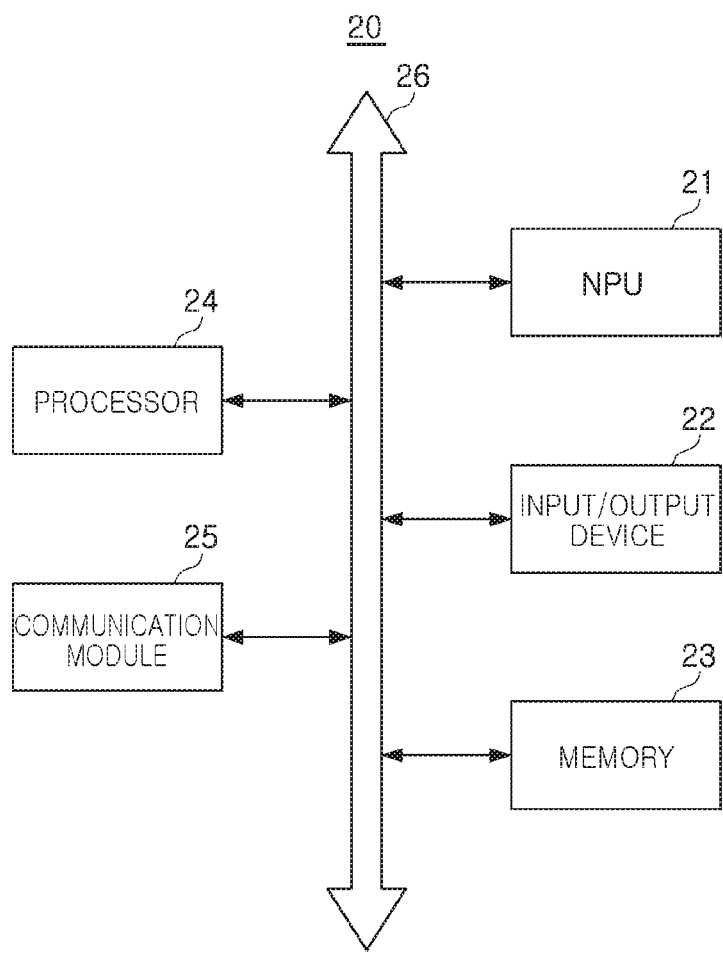
FIG. 11 is a view illustrating an electronic device including a neural processing unit according to an exemplary embodiment of the present inventive concept.

Referring to FIG. 11, an electronic device 20 includes a neural processing unit (NPU) 21, a memory 23, an input/output device 22, a processor 24, and a communication module 25. In addition, the electronic device 20 may further include at least one of a power supply device and a display device.

The processor 24 may perform specific operations, instructions, and tasks. The processor 24 may be a central processing unit (CPU) or a microprocessor unit (MCU), or a system on a chip (SoC), and may communicate with the neural processing unit 21, the memory 23, the input/output device 22, and the communication module 25 through a bus 26.

The memory 23 may be a storage medium that stores learning or training data required for machine learning. The memory 23 may include a volatile memory such as a random access memory (RAM), or a nonvolatile memory such as a flash memory. In addition, the memory 22 may include at least one of a solid state drive SSD, a hard disk drive HDD, and an optical drive ODD as a storage device. The input/output device 22 may include input devices such as a keyboard, a mouse, and a touchscreen, provided to a user, and output devices such as a display, and an audio output unit (e.g., a speaker).

The neural processing unit 21 may include an arithmetic circuit according to various exemplary embodiments of the present inventive concept described above with reference to FIGS. 1 to 8, to perform a multiply-accumulate (MAC) operation required for machine learning. The arithmetic circuit included in the neural processing unit 21 may be designed using a pipelining method, and may include a flip-flop connected only to a critical path without following the feedforward-cutset rule. Therefore, since the neural processing unit 21 according to an at least one exemplary embodiment of the present inventive concept may greatly reduce the number of flip-flops required for MAC operations, the neural processing unit 21 may not only reduce the chip size but also reduce the power consumption.

As set forth above, according to at least one exemplary embodiment of the present inventive concept, an arithmetic circuit may include a flip-flop connected only to a critical path without following a feedforwad-cutset rule, thereby minimizing the number of flip-flops required for MAC operations.

In addition, the arithmetic circuit according to at least one exemplary embodiment of the present inventive concept is capable of reducing the size and power consumption of a chip by minimizing the number of flip-flops required for MAC operations.

While exemplary embodiments of the inventive concept have been shown and described above, it will be apparent to those skilled in the art that modifications and variations could be made without departing from the scope of the present inventive concept.

What is claimed is:

1. An arithmetic circuit, comprising:
an input buffer latching each of a plurality of input signals, sequentially input, and sequentially outputting a plurality of first addition signals and a plurality of second addition signals based on the plurality of input signals;
an output buffer comprising a first output buffer and a second output buffer;
a first ripple carry adder (RCA) performing a first part of an accumulation operation on each of the plurality of first addition signals and an output of the first output buffer to generate a first sum signal and a carry;
a flip-flop;
a second RCA performing a second part of the accumulation operation on each of the plurality of second addition signals and an output of the flip-flop to generate a second sum signal, wherein the first RCA latches the carry in the flip-flop after performing the accumulation operation; and a logic circuit generating a (k-n) bit signal through sign extension according to an uppermost bit of each of the input signals, and determining a value of at least a portion of the (k-n) bit signal according to the carry and the uppermost bit of each the input signals, wherein the first output buffer latches the first sum signal, the second output buffer latches the second sum signal, and the output buffer outputs a total sum signal representing a sum of the plurality of input signals, and wherein each of the input signals is an n-bit signal, where n is an integer greater than or equal to 1, and the total sum signal is a k-bit signal, where k is an integer greater than n.

2. The arithmetic circuit of claim 1, wherein the logic circuit generates the (k-n) bit signal of a corresponding one of the input signals as a signal including a plurality of bits each set to 1, when the uppermost bit of the one input signal is 1 and the carry is 0.

3. The arithmetic circuit of claim 1, wherein the logic circuit generates the (k-n) bit signal including at least one bit set to 0, when the uppermost bit of the corresponding input signal is 1 and the carry is 1.

4. The arithmetic circuit of claim 1, wherein the first RCA receives the first addition signals directly from the input buffer and the second RCA receives the second addition signals directly from the input buffer.

5. The arithmetic circuit of claim 1, wherein the total sum signal is invalid until two cycles after the input buffer receives a final input signal.

6. A neural processing unit, comprising:
a multiplier receiving an n-bit first signal and an m-bit second signal, and outputting a value generated by multiplying the first signal by the second signal;
an input buffer latching each of a plurality of input signals, sequentially input from the multiplier, and sequentially outputting a plurality of first addition signals and a plurality of second addition signals according to each of the plurality of input signals;
a first ripple carry adder (RCA) performing a first part of an accumulation operation accumulating on each of the plurality of first addition signals to generate a first sum signal and a carry;
a first flip-flop;
a second RCA performing a second part of the accumulation operation on each of the plurality of second addition signals and an output of the first flip-flop to generate a second sum signal, wherein the first RCA latches the carry in the first flip-flop after performing the accumulation operation; and
an output buffer latching the first sum signal and the second sum signal, and outputting a total sum signal representing a sum of the plurality of input signals,
wherein the total sum signal is invalid until two cycles after the input buffer receives a final input signal,
wherein the multiplier comprises a plurality of stages performing full addition or half addition on at least a portion of bits.

7. The neural processing unit of claim 6, wherein the multiplier further comprises at least one or more second flip-flops disposed on a path, associated with bits for which the full addition or the half addition is performed between the plurality of stages.

8. The neural processing unit of claim 6, further comprising a logic circuit generating a (k-n) bit signal through sign extension according to an uppermost bit of a corresponding one of the input signals, wherein the one input signal is an n-bit signal, where n is an integer greater than or equal to 1, and the total sum signal is a k-bit signal, where k is an integer greater than n.

9. The neural processing unit of claim 6, further comprising a logic circuit generating a (k-n) bit signal through sign extension according to an uppermost bit of a corresponding one of the input signals, and determining a value of at least a portion of the (k-n) bit signal according to the carry and the uppermost bit of the one input signal, wherein the one input signal is a n-bit signal, where n is an integer greater than or equal to 1, and the total sum signal is a k-bit signal, where k is an integer greater than n.

10. The neural processing unit of claim 9, wherein the logic circuit generates the (k-n) bit signal including at least one bit set to 1, when the uppermost bit of the one input signal is 1 and the carry is 0.

11. The neural processing unit of claim 9, wherein the logic circuit generates the (k-n) bit signal including at least one bit set to 0, when the uppermost bit of the one input signal is 1 and the carry is 1.

12. The neural processing unit of claim 6, wherein the first RCA receives the first addition signals directly from the input buffer and the second RCA receives the second addition signals directly from the input buffer.

13. An electronic device, comprising:
a memory storing data; and
a neural processing unit including an arithmetic circuit, and performing machine learning using the data,
wherein the arithmetic circuit comprises:
an input buffer latching each of a plurality of input signals, sequentially input, and sequentially outputting a plurality of first addition signals and a plurality of second addition signals according to each of the plurality of input signals;
a first ripple carry adder (RCA) performing a first part of an accumulation operation on the plurality of first addition signals to generate a first sum signal and a carry;
a flip-flop;
a second RCA performing a second part of the accumulation operation one the plurality of second addition signals and an output of the flip-flop to generate a second sum signal, wherein the first RCA latches the carry in the first flip-flop after performing the accumulation operation; and
an output buffer latching the first sum signal and the second sum signal, and outputting a total sum signal,
wherein each of the input signals is an n-bit signal, where n is an integer greater than or equal to 1, and the sum signal is a k-bit signal, where k is an integer greater than n, the arithmetic circuit further comprises a logic circuit generating a (k-n) bit signal through sign extension according to an uppermost bit of a corresponding one of the input signals, and determining a value of at least a portion of the (k-n) bit signal according to the carry and the uppermost bit of the one input signal.

14. The electronic device of claim 13, wherein the neural processing unit further comprises a multiplier receiving an n-bit first signal and an m-bit second signal, and outputting a multiplied value generated by multiplying the first signal by the second signal as the plurality of input signals, wherein the multiplier comprises at least one flip-flop disposed on a path associated with bits for which a full addition operation or a half addition operation is performed.

15. The electronic device of claim 13, wherein the logic circuit generates the (k-n) bit signal include a plurality of bits each set to 1, when the uppermost bit of the one input signal is 1 and the carry is 0.

16. The electronic device of claim 13, wherein the logic circuit generates the (k-n) bit signal as a signal having at least one bit set to 0, when the uppermost bit of the one input signal is 1 and the carry is 1.

* * * * *